United States Patent
Gering

(10) Patent No.: US 8,363,048 B2
(45) Date of Patent: Jan. 29, 2013

(54) METHODS AND APPARATUS FOR VISUALIZING DATA

(75) Inventor: David Thomas Gering, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 882 days.

(21) Appl. No.: 11/560,548

(22) Filed: Nov. 16, 2006

(65) Prior Publication Data

US 2008/0117203 A1 May 22, 2008

(51) Int. Cl.
*G06T 15/00* (2006.01)
*G06T 17/00* (2006.01)
*G06K 9/00* (2006.01)
*G09B 9/00* (2006.01)
*A61B 5/00* (2006.01)

(52) U.S. Cl. ........ 345/419; 345/420; 345/424; 382/128; 382/130; 382/132; 434/2; 434/6; 434/267; 600/310; 600/410

(58) Field of Classification Search .................. None
See application file for complete search history.

(56) References Cited

U.S. PATENT DOCUMENTS

| | | | |
|---|---|---|---|
| 4,697,597 A | 10/1987 | Sanz et al. | |
| 4,700,712 A | 10/1987 | Schmid | |
| 4,862,897 A | 9/1989 | Eisenberg et al. | |
| 4,924,875 A | 5/1990 | Chamoun | |
| 5,046,504 A | 9/1991 | Albert et al. | |
| 2005/0231713 A1* | 10/2005 | Owen et al. | 356/237.1 |
| 2006/0072799 A1* | 4/2006 | McLain | 382/128 |
| 2006/0290695 A1* | 12/2006 | Salomie | 345/420 |
| 2007/0247454 A1* | 10/2007 | Rahn et al. | 345/419 |
| 2007/0279436 A1* | 12/2007 | Ng et al. | 345/624 |

OTHER PUBLICATIONS

Joseph Woo, "Obstetric Ultrasound", Nov. 5, 2005, http://web.archive.org/web/20051105024634/www.ob-ultrasound.net.*
Matlab—3D plotting, Online College, Sept. 7, 2006, http://www2.ohlone.edu/people2/bbradshaw/matlab/plotting3dsurfaces.html.*
Logitech's WingMan® Force™ 3D Joystick, Jul. 5, 2000, http://www.logitech.com/index.cfm/172/1177&cl=us,en.*
Gnuplot: 3-Dim plot with a color-map (pm3d), Jun. 3, 2005, http://web.archive.org/web/20050603014816/http://t16web.lanl.gov/Kawano/gnuplot/plotpm3d-e.html.*
Weidenbacher et al, Sketching Shiny Surfaces: 3D Shape Extraction and Depiction of Specular Surfaces, ACM Transactions on Applied Perception, vol. 3, No. 3, Jul. 2006, pp. 262-285, http://delivery.acm.org/10.1145/1170000/1166094/p262-weidenbacher.pdf.*
Author: Nabavi et al.; Title: Serial Intraoperative Magnetic Resonance Imaging of Brain Shift; Item: Neurosurgery, vol. 48, No. 4; Date: Apr. 2001; pp. 12 (787-798).
Author: Neubauer et al.; Title: Advanced Virtual Endoscopic Pituitary Surgery; Item: IEEE Transactions on Visualization and Computer Graphics, vol. 11, No. 5; Date: Sep./Oct. 2005; pp. 11 (497-507).
Gering, "A Flight Simulator Approach to the Visualization of Dynamic Medical Data," International Conference on Computer Graphics and Interactive Techniques, ACM SIGGRAPH 2006, Boston, Mass., Jul. 30-Aug. 3, 2006.
Gering et al., "An Integrated Visualization System for Surgical Planning and Guidance Using Image Fusion and an Open MR," Journal of Magnetic Resonance Imaging, vol. 13, 2001, pp. 967-975.

* cited by examiner

Primary Examiner — Tize Ma
(74) Attorney, Agent, or Firm — ZPS Group, SC

(57) ABSTRACT

A method for visualizing data includes the step of providing a virtual flight visualization of image data representing a non-landscape object.

18 Claims, 6 Drawing Sheets

METHODS AND APPARATUS FOR VISUALIZING DATA

BACKGROUND OF THE INVENTION

This invention relates generally to a system for visualizing data, and more particularly, to systems and methods that provide for a virtual flight visualization of a non-landscape object.

Typically, the visualization of 3-D medical scan data is performed using surface rendering or volume rendering. Surface rendering is well-suited for applications where segmentation of key structures is desired to provide good visualization, such as with MRI data. Surface rendering is also well-suited where a polygonal mesh can be wrapped around the segmented structures to form a surface model. Volume rendering is well-suited for applications where the assignment of color and opacity values are straight forward in light of the image voxel intensities. This is particularly true for CT data when there is a strong correlation between the Hounsfield units and tissue types.

Further, the rendering of medical scan data tends to be photo-realistic volume rendering which can be augmented using non-photo-realistic rendering. For example, functional information, such as the fMRI of the motor cortex, is colorized and overlaid on gray-scale anatomical data. Further, 3-D graphical cues can be added to guide trajectories during minimally invasive surgeries. Historically, the medical scan data has been presented in such a manner that promotes geometric realism.

Therefore, it would be advantageous to provide systems and methods for visualizing data which are not constrained by the need for geometric realism, but rather can exaggerate contrast using not only color, but also geometry.

BRIEF DESCRIPTION OF THE INVENTION

In one aspect, a method for visualizing data is provided wherein the method includes the step of providing a virtual flight visualization of image data representing a non-landscape object.

In another aspect, a method of visualizing data includes the step of assigning a height to a vertex based upon a non-landscape image pixel value or voxel value.

In yet another aspect, a system is provided. The system includes a detector positioned to receive energy transmitted through or emitted from a non-landscape object, a machine readable medium coupled to the detector, and a set of machine readable instructions embodied in the computer readable medium for providing a virtual flight visualization of the received energy from the non-landscape object.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems and modalities such as PET, MRI, SPECT, Ultrasound, fused systems such as a CT/PET system, and/or any modality yet to be developed in which data results from the imaging system.

Figure 1:
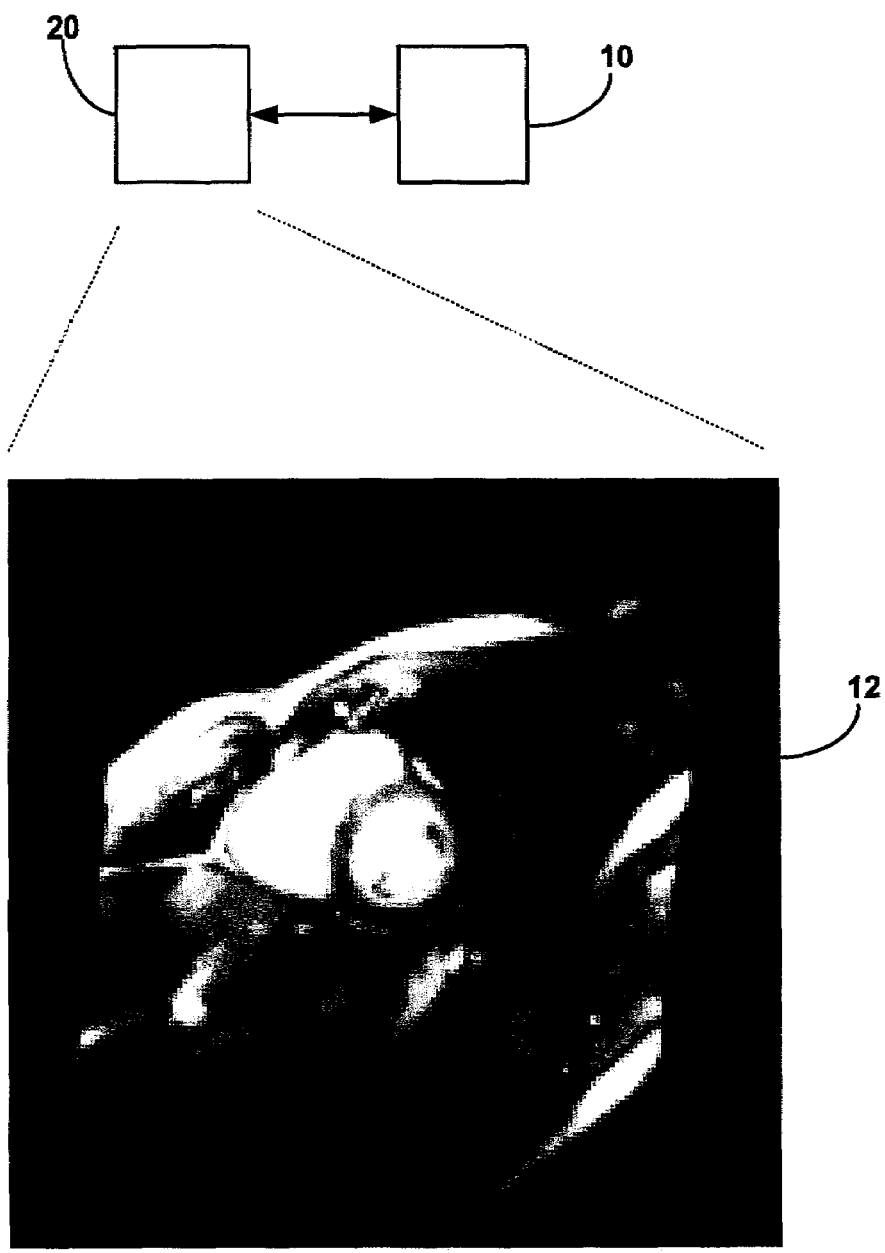
FIG. 1 illustrates an exemplary diagnostic imaging system and resulting image.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and a scan can be done in one modality (e.g., CT) and the processed data can be transferred to the other modality (e.g., PET). Display 20 can be separate from system 10 or integrated with system 10. System 10 includes an acquisition device such as an x-ray radiation detector, a Gamma Camera, an ultrasound probe and/or an MRI coil.

The x-ray imaging system includes a processing circuit. The processing circuit (e.g., a microcontroller, microprocessor, custom ASIC, or the like) is coupled to a memory and a display device. The memory (e.g., including one or more of a floppy disk drive, CD-ROM drive, DVD drive, magnetic optical disk (MOD) device, or any other digital device including a network connecting device such as an Ethernet device for reading instructions and/or data from a computer-readable medium, such as a floppy disk, or an other digital source such as a network or the Internet, as well as yet to be developed digital means, and the like) stores imaging data.

The memory may also store a computer program including instructions executed by the processing circuit to implement the functions described herein. The processing circuit provides an image for display on a device. The detector may be a flat panel solid state image detector, for example, although conventional film images stored in digital form in the memory may also be processed. In one embodiment, the processing circuit executes instructions stored in firmware (not shown).

Once a scan is done using imaging system 10, image data 12 is produced which represents the results of the image. The image represents the human anatomy, or physical objects such as detected in airport or other transportation scanners, or manufactured items such as semi-conductors. This image data does not represent topography of the earth's surface or other physical geographic regions such as those subject to map making, surveying, or graphical information systems. As such, the subject of the image system is a non-landscape object.

Through the creation of the image from a scan, the herein described methods and apparatus can also be part of performing non-destructive tests on objects. For example, testing semi-conductors traditionally has involved testing procedures that destroy the semi-conductor being tested. Therefore, scanning processes, such as x-ray systems, have been used to test semi-conductors in a non-destructive manner. The herein described methods and apparatus can be used with such a testing process to provide a virtual flight simulation for non-destructive testing, including non-destructive testing of semi-conductors.

Figure 2:
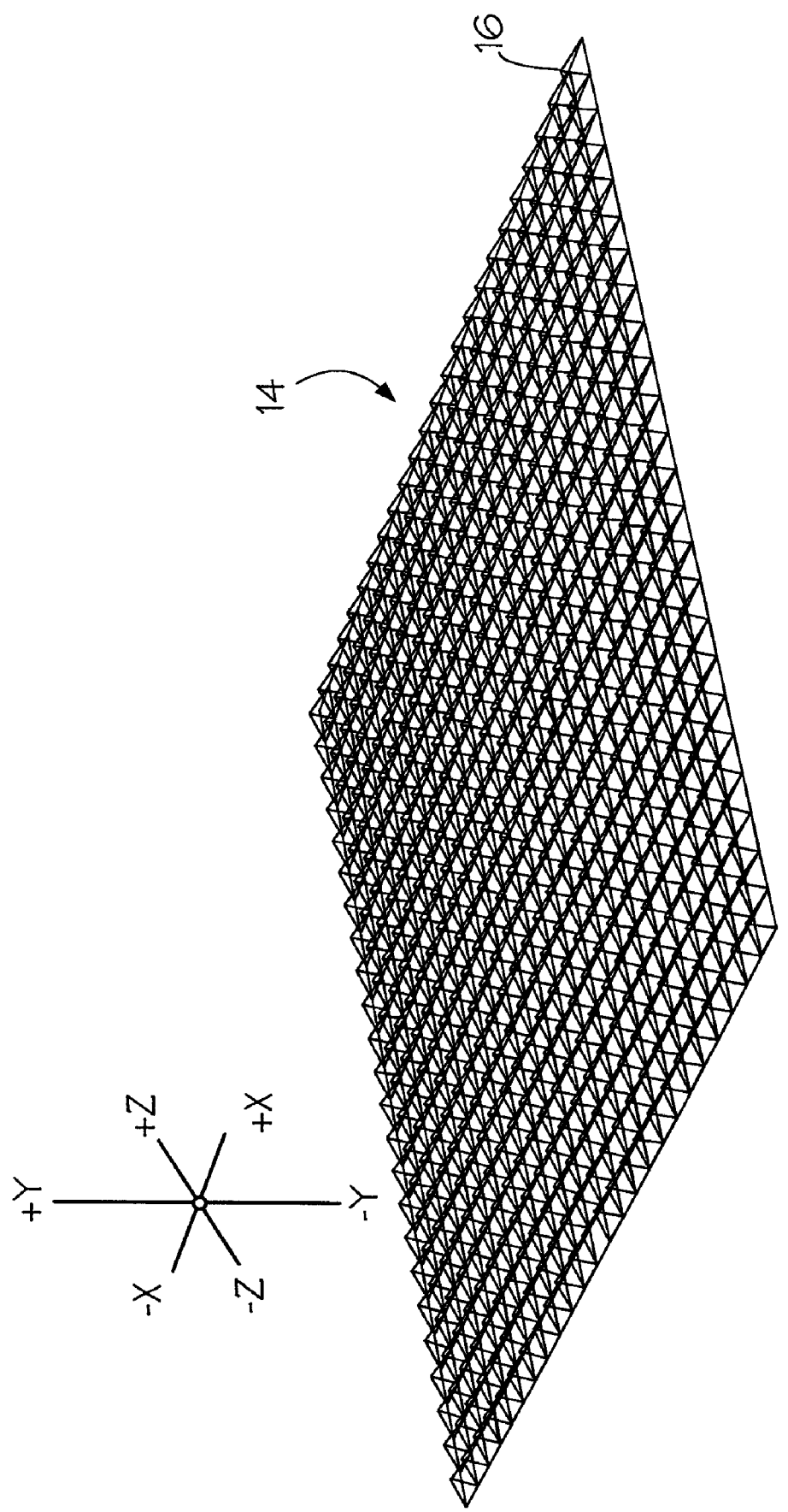
FIG. 2 illustrates an exemplary initial plot sheet.
Figure 3:
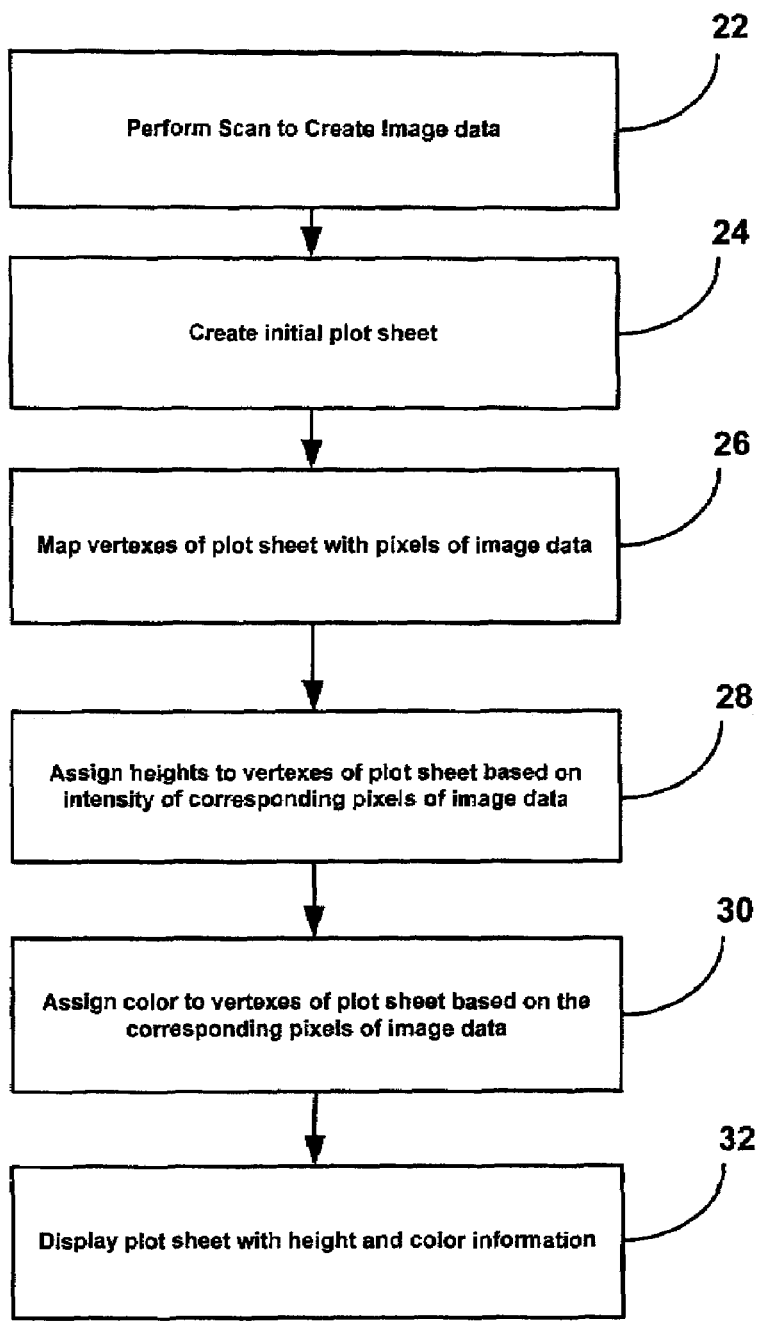
FIG. 3 is a flowchart.

This non-landscape object is represented by image 12 which is the result of the scan performed by the image scanner 10. A plot sheet 14 of FIG. 2 is then created which has a vertex corresponding to a pixel of the image data. The image data is tessellated into a triangular mesh, in one embodiment, so that the plot sheet contains a plurality of triangular portions. The scan is performed to create the image data in step 22 of FIG. 3 and the initial plot sheet is created in step 24. Each vertex of the plot sheet is mapped to a pixel of the image data in step 26. A height is assigned to the vertex corresponding to the pixel based upon the intensity of the corresponding pixel in step 28. A color is assigned to the vertex based upon the corresponding pixel of the image data in step 30. The color can be assigned based upon a function of brightness or by anatomical information, or by functional information. It should also be noted that the height for each vertex can be either a linear or non-linear transfer function from the corresponding pixel. Therefore, the plot sheet can be displayed and has the advantage of showing contrast between data points which are accentuated by both color and elevation. This provides for a novel perspective of displaying image data for non-landscape objects which provides advantages over simply displaying in color alone. The plot sheet can then be displayed in step 32. Additionally, the image could be reformatted, such as super-sampled to create more pixels or sub-sampled to create fewer pixels, prior to mapping the image to the mesh. Also, the mesh need not be a triangular mesh, as squares would be another popular option. Any known flight controls, such as a joystick, may be used to achieve the visualization.

Figure 4:
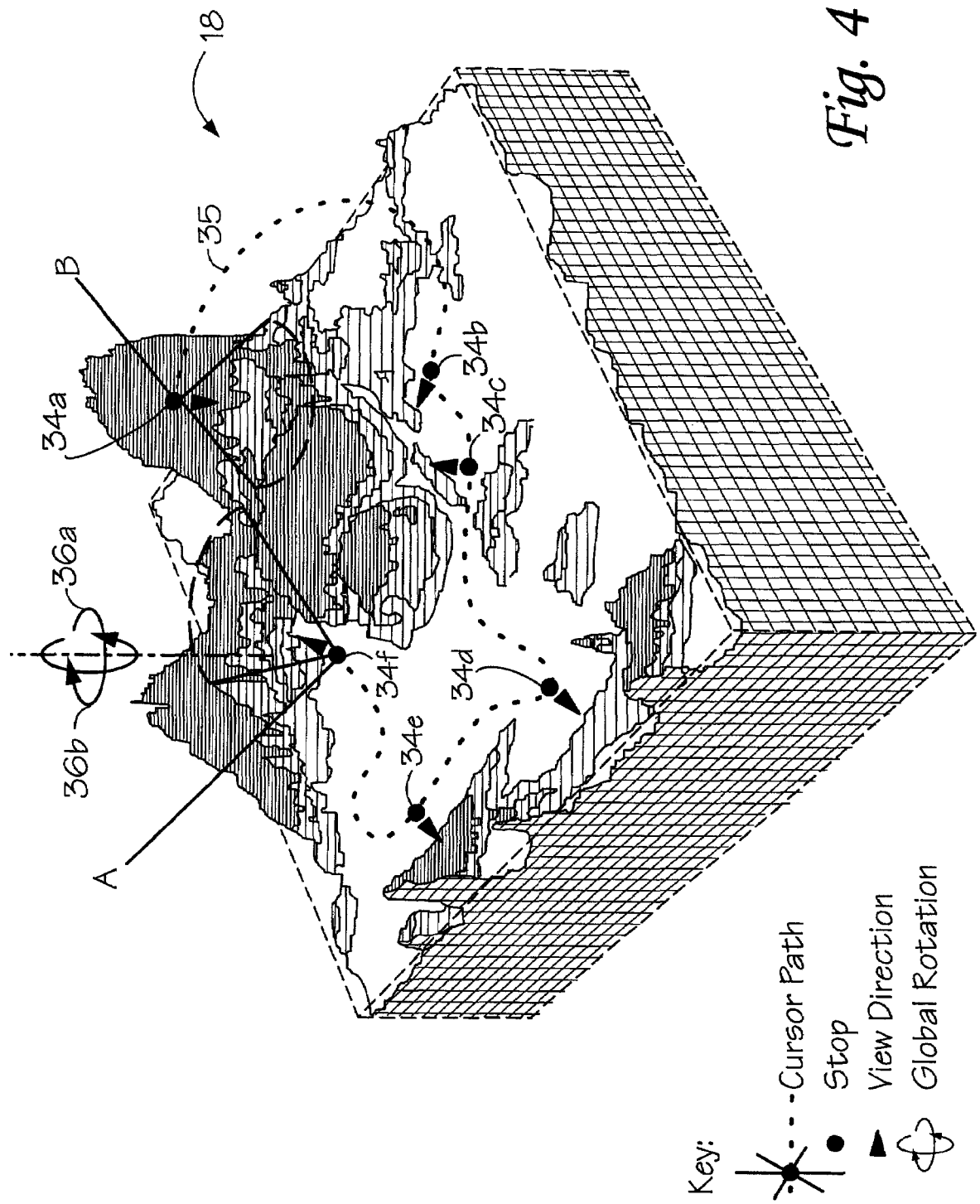
FIG. 4 illustrates a virtual flight visualization.

Once the plot sheet is displayed, the point of view and spatial frame of reference can be altered to provide a virtual flight visualization 18 of image data 12 as shown in FIG. 4. In the virtual flight visualization, the user can view the plot sheet from any number of points of reference. For example, the user can manipulate the virtual flight visualization so as to make it appear that the user is viewing the plot sheet from points of reference 34a-34f, by way of example. Further, the user can "fly" along a path 35 to reach the points of reference thereby experiencing virtual flight visualization. Further, the user can rotate the point of reference view 360° in any direction with exemplary directions shown as 36a and 36b.

Figure 5:
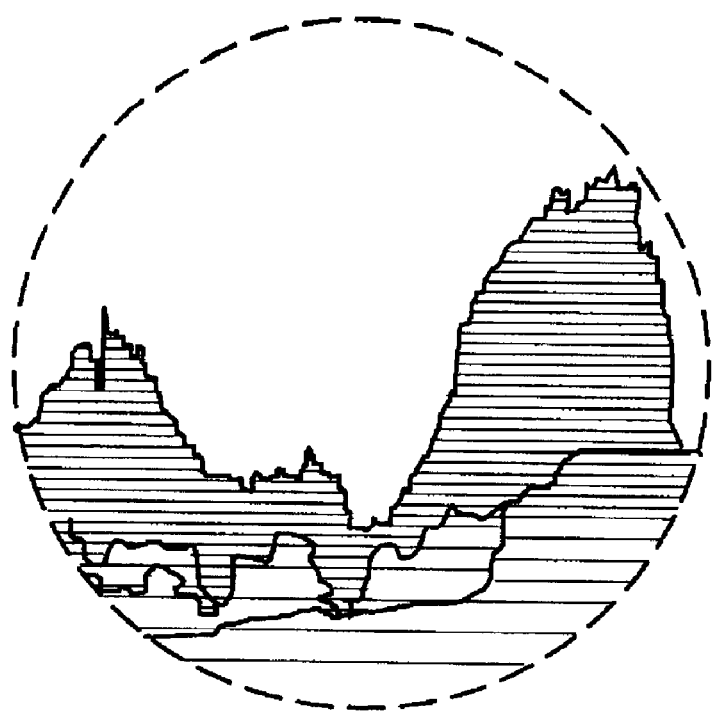
FIG. 5 illustrates a view from a point of reference of a plot sheet.
Figure 6:
FIG. 6 illustrates exemplary view from a point of reference of a plot sheet.

When the user is viewing the plot sheet from point of reference 34f, the view is shown in FIG. 5. This view is in generally an upward direction and shown for illustration purposes with a circular field of view. When the user is viewing the plot sheet from point 34a, the view is shown in FIG. 6. This view is generally a downward direction and shown for illustrative purposes with a circular field of view. By moving the point of reference, the user can fly around the plot sheet to view the plot sheet from a multitude of points about the plot sheet in three dimensions.

The point of reference can be controlled through machine readable instructions to allow the user to explore the plot sheet area. Therefore, the user can manipulate the point of reference for different positions and orientations. Effectively, the user can pilot or fly the point of reference to achieve a desired view of the plot sheet area. Further, by manipulating the point of reference to within the plot sheet allowing the user to view certain areas while other areas are outside the field of view according to the point of reference.

Further, virtual flight visualization can allow the user to fly through the surfaces of the plot sheet, bounce off the surfaces, or fly under or through the surfaces to view the image from inside or outside the area of the plot sheet.

The image can also have time points which represent slices of a non-landscape object image. Slices are sequences of sections through the non-landscape object. The slices can each correspond to a plot sheet. Therefore, the plot sheets corresponding to the slices can be displayed in sequence so that the plot sheet may change over time. The user can then see the vertex grow, shrink, or change color according to the plot sheet being displayed. As shown in FIG. 67, slices are created in step 46 and if there are further slices to process in step 48, then the plot sheet is created for the unprocessed slices in step 50. The plot sheet is modified based upon steps 26 through 30 of FIG. 3 in step 52 and the process moves to the next layer in step 54. In another embodiment, the plot sheet can be modified without having to store a plot sheet for each slice according to the particular slices. Therefore, the plot sheet vertex can grow, shrink, or change color according to the current slice. This allows the user to view changes in the plot sheet according to the current slice.

Therefore, not only can the user have a virtual flight visualization for a non-landscape object for a particular time point, but can have multiple time points to "fly" through. The plot sheet can be re-rendered according to each time point or slice to illustrate the changes according to the time points of the non-landscape object. As such, the heights and color of the plot sheet can be modified so that the plot sheet re-rendering represents the changes in the non-landscape object over time.

In one embodiment, the user has the ability to easily switch back between regular mode and virtual flight mode. In another embodiment, where there may be a need to interpolate, when one has a priori knowledge of the anatomy, one can use the a priori knowledge to eliminate or reduce false structures. Additionally, one can use Computer Aided Detection (CAD) programs with the virtual flight. Also, one can use a computer aided diagnostic (also CAD) program to identify nodules, and then ignore all other structures to help eliminate or reduce false positives. Any known CAD computer assisted diagnostic may be used to identify structure before doing the virtual flight, and aberrations may be ignored.

Also one can use other artifact reduction techniques, for example, most human anatomy is generally not streaky so one can ignore streaks when found in certain areas of the human body.

In general, artifact reduction can be built in with the flight simulation based on one knowing the anatomy or other structure to be scanned. In other words, one may perform a CAD operation on the data and suppress all features not detected by the CAD. One could also identify regions just using a priori information on different regions or by assigning different base heights to different regions. For example in a chest scan, the heart heights may vary from 1000 to 10000, while the lung heights vary from 0 to 9000, or one could have different dynamic ranges for different structures, while the heart region can have 9000 different values, maybe the lung region has 6000 or 20000, the dynamic range can be optimized to aid processing speed versus storage requirements.

Of course, the methods described herein are not limited to practice in system 10 and can be utilized in connection with many other types and variations of imaging systems. In one embodiment, the processing circuit is a computer that is programmed to perform functions described herein, and, as used herein, the term computer is not limited to just those integrated circuits referred to in the art as computers, but broadly refers to computers, processors, microcontrollers, microcomputers, programmable logic controllers, application specific integrated circuits, and other programmable circuits. Although the herein described methods are described in a human patient setting, it is contemplated that the benefits of the invention accrue to non-human imaging systems such as those systems typically employed in small animal research. Although the herein described methods are described in a medical setting, it is contemplated that the benefits of the invention accrue to non-medical imaging systems such as those systems typically employed in an industrial setting, a transportation setting, such as, for example, but not limited to, a baggage scanning CT system for an airport or other transportation center, or scanning manufactured items such as semi-conductor devices.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also, as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A non-transitory computer readable medium having a computer program stored thereon and representing a set of instructions that when executed by a computer causes the computer to:
    acquire a set of image data corresponding to a non-landscape object and comprising a plurality of pixels;
    generate a series of three-dimensional plot sheets having a plurality of vertices corresponding to the plurality of pixels of the set of image data;
    assign a dimensional display characteristic to each of the plurality of vertices;
    assign a non-dimensional display characteristic to each of the plurality of vertices; and
    display the series of three-dimensional plot sheets as a sequence of images, wherein the dimensional and non-dimensional display characteristics of the plurality of vertices are re-rendered between sheets of the series of three-dimensional plot sheets;
    wherein the dimensional display characteristic comprises a vertical height for each of the plurality of vertices and the non-dimensional display characteristic comprises a display color for each of the plurality of vertices; and
    wherein the vertical height and the display color are assigned based on different criteria, with the vertical height being assigned to each of the plurality of vertices based on pixel intensity and the display color being assigned to each of the plurality of vertices based on at least one of anatomical information and functional information.

2. The non-transitory computer readable medium of claim 1 wherein the set of instructions causes the computer to assign the vertical height to each of the plurality of vertices based on an intensity of a respective pixel of the plurality of pixels.

3. The non-transitory computer readable medium of claim 1 wherein the set of instructions causes the computer to display a virtual flight visualization of the series of three-dimensional plot sheets responsive to a user input.

4. The non-transitory computer readable medium of claim 3 wherein the set of instructions causes the computer to display a 360 degree reference view at a user-selected point of reference of the series of three-dimensional plot sheets.

5. The non-transitory computer readable medium of claim 1 wherein the set of instructions causes the computer to assign the dimensional and non-dimensional display characteristics using one of a linear transfer function and a non-linear transfer function.

6. The non-transitory computer readable medium of claim 1 wherein the set of instructions causes the computer to generate a three-dimensional plot sheet having a plurality of triangular vertices.

7. The non-transitory computer readable medium of claim 1 wherein the set of instructions further causes the computer to re-render the three-dimensional plot sheet based on changes in the dimensional and non-dimensional display characteristics over a plurality of time points.

8. The non-transitory computer readable medium of claim 1 wherein the set of instructions that causes the computer to generate the series of three-dimensional plot sheets causes the computer to generate three-dimensional plot sheets to represent respective slices of the non-landscape object.

9. A computerized imaging method comprising:
    acquiring scan data from a non-landscape object using one of an x-ray system, a PET system, an MRI system, a SPECT system, an ultrasound system, and a CT/PET system;
    producing image data corresponding to the non-landscape object from the scan data from which an image of the non-landscape object can be formed;
    constructing a three-dimensional plot sheet having a plurality of vertices corresponding to a plurality of pixels of the image data;
    generating a pair of display parameters for each of the plurality of vertices based on the image data, wherein the pair of display parameters comprises a dimensional parameter and a non-dimensional parameter, with the dimensional parameter and the non-dimensional parameter being determined based on separate and distinct image data parameters;
    displaying the pair of display parameters on the three-dimensional plot sheet; and
    generating a virtual flight visualization of the three-dimensional plot sheet having a point of reference that is independent of the acquisition of scan data.

10. The imaging method of claim 9 comprising:
    generating a height for display of each of the plurality of vertices; and
    generating a color for display of each of the plurality of vertices.

11. The imaging method of claim 9 further comprising enabling a user to manipulate the point of reference via a user interface to fly though surfaces of the three-dimensional plot sheet, bounce off surfaces of the three-dimensional plot sheet, and fly under or through surfaces of the three-dimensional plot sheet.

12. The imaging method of claim 9 comprising accessing image data corresponding to one of an object of the human anatomy, a physical object, and a manufactured item.

13. The imaging method of claim 9 further comprising:
    identifying regions of distinct anatomy on the three-dimensional plot sheet based on a priori information; and
    assigning a base height to the plurality of vertices within each respective region of distinct anatomy, wherein the base height for a given respective region of distinct anatomy has a magnitude corresponding to a type of distinct anatomy in the given respective region.

14. An imaging system comprising:
an acquisition device configured to acquire image data corresponding to a non-landscape object, wherein the image data comprises a plurality of pixels, and wherein the acquisition device comprises one of an x-ray detector, a Gamma Camera, an ultrasound probe, and an MRI coil; and
a processor configured to:
  access the image data;
  generate a three-dimensional plot having a plurality of vertices, wherein each vertex corresponds to a respective pixel of the image data;
  assign display parameters to the plurality of vertices, one display parameter generated from pixel intensity data and another display parameter assigned based on pixel functional information data;
  display a three-dimensional representation of the non-landscape object, wherein the image data is represented as the display parameters on the three-dimensional plot;
  display a virtual flight visualization of the three-dimensional plot; and
  enable a user to manipulate a point of reference of the virtual flight visualization at a point in time following acquisition of the image data.

15. The imaging system of claim 14 wherein the processor is configured to assign a color representation and a height representation to each of the plurality of vertices.

16. The imaging system of claim 15 wherein the acquisition device comprises an MRI system; and
wherein the processor is further configured to:
  generate the height representation for display of each of the plurality of vertices based on intensity data of a pixel corresponding to the respective vertex; and
  generate the color representation for display of each of the plurality of vertices based on functional MRI data (fMRI) of a pixel corresponding to the respective vertex.

17. The imaging system of claim 14 wherein the user interface enables the user to simulate flight though surfaces of the three-dimensional plot, simulate deflection off surfaces of the three-dimensional plot, and simulate flight under or around surfaces of the three-dimensional plot.

18. The imaging system of claim 14 wherein the processor is further configured to:
  generate a series of three-dimensional plots;
  display the series of three-dimensional plots as a sequence of images; and
  enable the user to view changes in the display parameters across the sequence of images.

* * * * *

UNITED STATES PATENT AND TRADEMARK OFFICE
CERTIFICATE OF CORRECTION

PATENT NO. : 8,363,048 B2  
APPLICATION NO. : 11/560548  
DATED : January 29, 2013  
INVENTOR(S) : David Thomas Gering Page 1 of 1

It is certified that error appears in the above-identified patent and that said Letters Patent is hereby corrected as shown below:

In the Specifications

Figure 7:
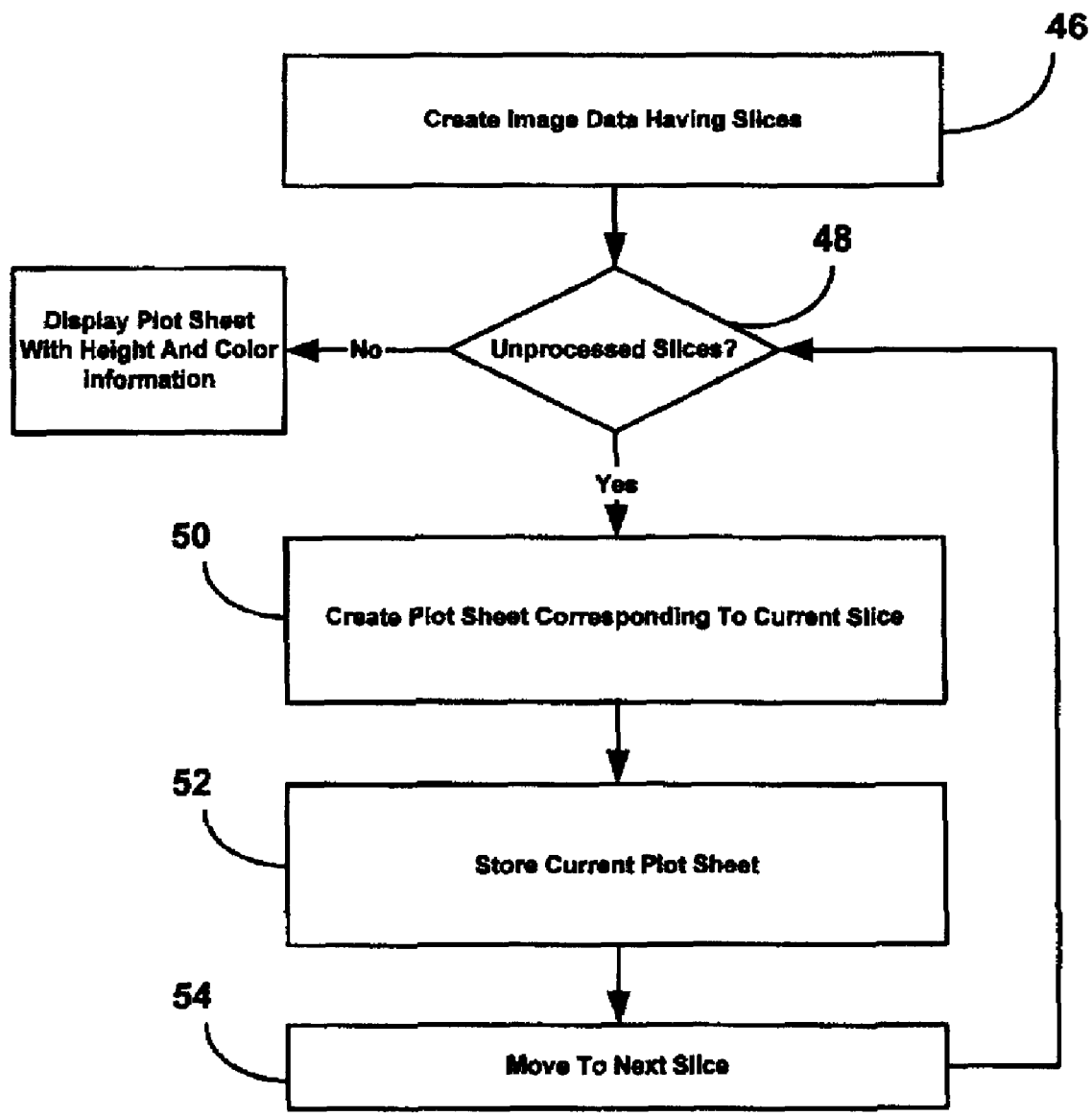
FIG. 7 is a flowchart.

Col. 4, line 1, delete "FIG. 67" and substitute therefore -- FIG. 7 --; and In the Claims Col. 6, line 53 (Claim 11), delete "fly though" and substitute therefore -- fly through --; and Col. 8, line 15 (Claim 17), delete "flight though" and substitute therefore -- flight through --.

Signed and Sealed this
Twenty-eighth Day of May, 2013

Teresa Stanek Rea
*Acting Director of the United States Patent and Trademark Office*